US007730179B2

(12) United States Patent
Tanner

(10) Patent No.: US 7,730,179 B2
(45) Date of Patent: Jun. 1, 2010

(54) SYSTEM AND METHOD FOR POLICY-BASED REGISTRATION OF CLIENT DEVICES

(75) Inventor: Ronald Martin Tanner, Provo, UT (US)

(73) Assignee: Novell, Inc., Provo, UT (US)

( * ) Notice: Subject to any disclaimer, the term of this patent is extended or adjusted under 35 U.S.C. 154(b) by 528 days.

(21) Appl. No.: 11/819,242

(22) Filed: Jun. 26, 2007

(65) Prior Publication Data

US 2009/0006636 A1    Jan. 1, 2009

(51) Int. Cl.
G06F 15/16    (2006.01)
G06F 15/173    (2006.01)
G06F 15/177    (2006.01)

(52) U.S. Cl. .................. 709/224; 709/703; 709/221; 709/222; 709/226

(58) Field of Classification Search .......... 709/203, 709/219, 220, 224, 226, 228; 713/172; 705/26
See application file for complete search history.

(56) References Cited

U.S. PATENT DOCUMENTS

| | | | | |
|---|---|---|---|---|
| 6,135,646 | A | 10/2000 | Kahn et al. | 395/200.47 |
| 6,697,806 | B1 | 2/2004 | Cook | 707/10 |
| 6,970,919 | B1* | 11/2005 | Doi et al. | 709/220 |
| 7,200,661 | B2 | 4/2007 | Jex et al. | 709/226 |
| 7,636,771 | B2* | 12/2009 | Torii | 709/219 |
| 2002/0140917 | A1 | 10/2002 | McArthur et al. | 355/53 |
| 2004/0057405 | A1 | 3/2004 | Black | 370/335 |
| 2004/0064692 | A1 | 4/2004 | Kahn et al. | 713/167 |
| 2005/0273399 | A1* | 12/2005 | Soma et al. | 705/26 |
| 2006/0174121 | A1* | 8/2006 | Omae et al. | 713/172 |
| 2006/0218288 | A1* | 9/2006 | Umezawa et al. | 709/228 |

FOREIGN PATENT DOCUMENTS

| | | |
|---|---|---|
| EP | 0964588 A2 | 12/1999 |
| EP | 1045598 A1 | 10/2000 |

OTHER PUBLICATIONS

ZENworks for Desktops, Deployment Manual, Version 3, Sep. 2000, Novell, Inc., pp. 1-202.
Novell's ZENworks Administrator's Handbook, Ron Tanner and Brad Dayley, Novell Press, 1999, pp. 141-215.
Akihiro Tominaga et al., "Problems and Solutions of DHCP—Experiences with DHCP Implementation and Operation", Apr. 28, 1995, internet document printed from http://www.isoc.org/HMP/PAPER/172/html/paper.html, 17 pages.

* cited by examiner

*Primary Examiner*—Quang N. Nguyen
(74) *Attorney, Agent, or Firm*—Pillsbury Winthrop Shaw Pittman LLP

(57) ABSTRACT

A system and method for policy-based registration of client devices is provided. Policy-based registration may use registration keys to register devices on a network. For example, registration keys may include policy assignments, folder assignments, group assignments, or other assignments for registering, identifying, and managing the device on the network. Devices can register one or more times (e.g., using one or more registration keys), resulting in the device being added to any number of folders and groups. Further, the policies may be used to control a registration process or to enforce registration rules. As such, administrators can construct folders or groups of devices with a set of keys, providing a consistent mechanism to easily register and manage a device.

27 Claims, 3 Drawing Sheets

SYSTEM AND METHOD FOR POLICY-BASED REGISTRATION OF CLIENT DEVICES

FIELD OF THE INVENTION

The invention relates to a system and method for registering and managing client devices on a network using one or more policies.

BACKGROUND OF THE INVENTION

Workstation registration can be used to manage a plurality of client devices coupled to a network (e.g., servers, workstations, etc.). Device registration may provide information regarding a particular device, a user of the device, or other information. To enable registration on the network, importation services may import information regarding a server or a workstation to register a device. Importing device information typically only occurs once, where the importation service initially creates a representation of a device to identify the device in a network system. For example, the representations could include device objects, database records, or any other suitable data structure or abstraction for representing workstations, servers, or other devices. Further, the device representations could be used various network systems, including a network tree implementation (e.g., a tree data structure or other abstraction) composed of the device objects, a database containing the records, or any other suitable system for managing and representing devices connected over the network. Upon creating an appropriate representation of a device, the importation service would then populate the management abstraction (e.g., database, network tree, etc.) using default values, and subsequently update device properties with current registration information.

Unlike device importation, device registration typically occurs when a manager program starts up, a user logs-in to a device management system, or a user logs-out of the device management system. Device registration typically includes a client device registering information about the device, a system administrator registering the device by importing the device information, and notifying the device that the registration has been processed. The device may then verify the registration and record a name assigned to the device. These types of existing systems typically require multiple steps and intervention by a plurality of users, increasing communications over the network and potentially creating bottlenecks, among other problems.

Other problems with existing registration systems relate to assigning rights for performing tasks. For example, task rights may be assigned to a server container, but such implementations may grant permissions based on broad classes or representations of devices. Thus, some devices may be granted undesired authorizations to perform particular tasks due to limitations of systems used to represent and manage devices. Furthermore, when a network organization includes a large number of devices and/or users (e.g., various user types, workstation types, etc.), existing systems often fail to provide adequate measures for easily managing task rights, deploying software updates, or otherwise managing similar classes of devices and/or users.

Existing systems suffer from these and other problems.

SUMMARY OF THE INVENTION

According to various aspects of the invention, a system and method for policy-based registration of devices (e.g., workstations, servers, etc.) may address these and other drawbacks of existing systems. For example, policy-based registration may include using a registration key to register a device on a network. The registration key may include one or more policy assignments, folder assignments, group assignments, or other assignments that can be used to register, identify, and manage the device on the network. Thus, the registration key can provide an additional level of management, allowing devices to be registered into one or more folders (e.g., to manage configuration settings) and/or groups (e.g., to manage assignments). The device can register one or more times (e.g., using one or more registration keys), resulting in the device being added to any number of folders and groups. Further, the policies may be used to control a registration process or to enforce registration rules (e.g., enforcing security restrictions when adding the device to a folder or group). As such, administrators can construct folders or groups of devices with a set of keys, providing a consistent mechanism to easily register and manage a device. For example, configuration settings for one or more devices registered to a folder may be managed by defining the configuration settings on the folder, rather than for each individual device. All devices in the folder would thus inherit the folder configuration settings without requiring an administrator to configure settings for each individual device. Similarly, devices may be organized into groups based on shared requirements (e.g., for software packages). As such, all devices in a group can be updated by making assignments to the group (e.g., a software update may be deployed to all devices in a group by defining the update over the group).

Other objects and advantages of the invention will be apparent to those skilled in the art based on the following drawings and detailed description.

DETAILED DESCRIPTION

Figure 1:
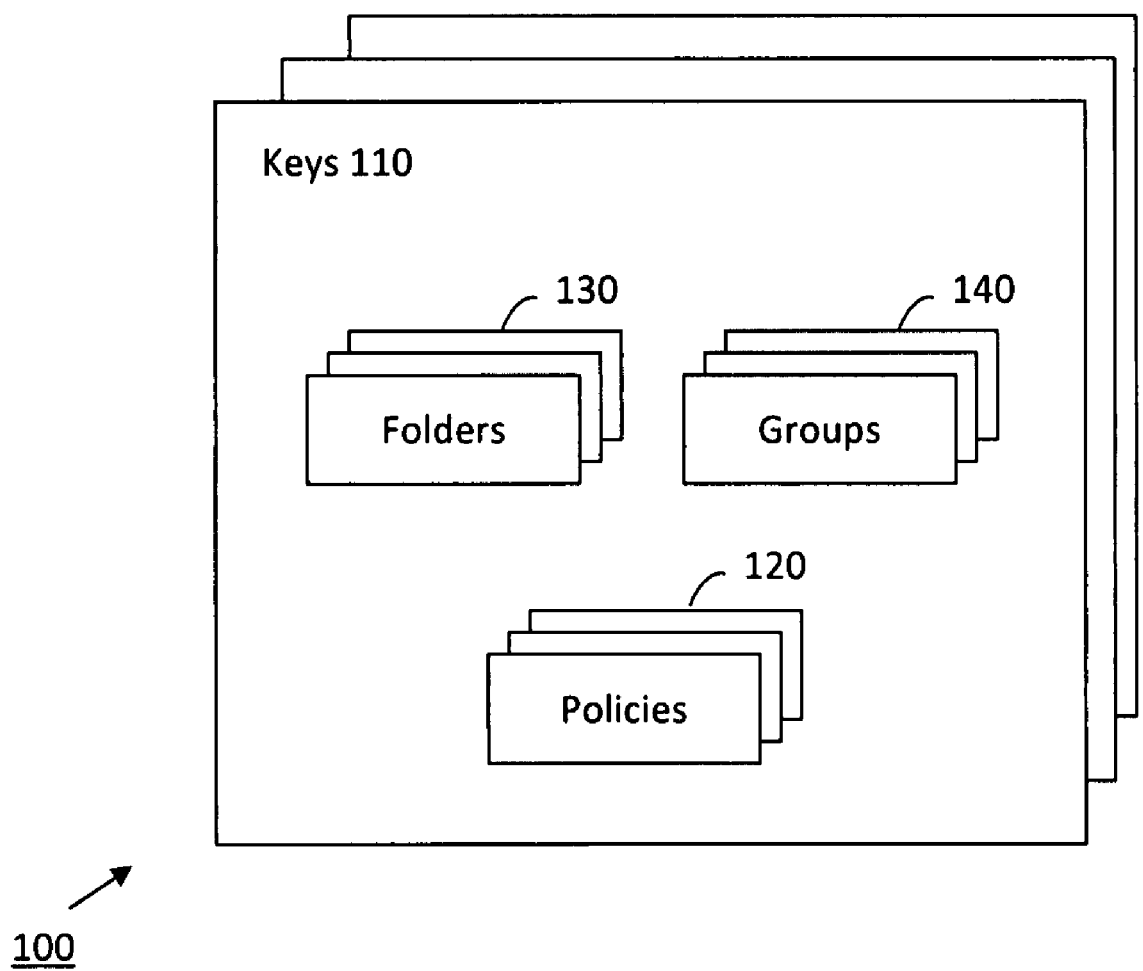
FIG. 1 illustrates an exemplary framework for policy-based registration of client devices according to various aspects of the invention.

Referring to FIG. 1, an exemplary framework 100 for policy-based registration of client devices is illustrated according to various aspects of the invention. For example, network administrators may use framework 100 to set up, install, register, and manage devices coupled to a network. The devices may include servers, workstations, mobile devices (e.g., laptops), or any other suitable client device that can connect to a managed network, as will be apparent. The managed network may be configured to require devices to register on the network in order to access network services. For example, a network management program may maintain a representation (e.g., a device object) for each registered workstation, server, or other device, which can be used to identify and manage the registered device. For instance, in various implementations, each registered device may be assigned a globally unique identifier that identifies the device on the network. Administrators can therefore rename, reorganize, or otherwise manage a device at a management center (e.g., a server system) by managing the representation of the registered device (e.g., by manipulating a device object associated with the device). The device could be configured to retain the assigned globally unique identifier, rather than the abstract device representation, such that the logical representation can remain linked to the managed device by a physical record (e.g., when a device accesses the network, the logical representation can always be located using the globally unique identifier linked to the device). According to various aspects of the invention, client devices can be registered using in any suitable network system that maintains representations of client devices (e.g., the system can represent devices by storing objects in a tree, database records in a database, or otherwise, without limitation, as will be apparent). For example, in an exemplary implementation, client devices may be registered and managed using techniques described, for example, in commonly owned U.S. Pat. No. 7,200,661, issued Apr. 3, 2007, entitled "System and Method for Registering a Client Device," the disclosure of which is hereby incorporated by reference in its entirety.

According to various aspects of the invention, a network may be configured to require registration of all workstations, servers, or other client devices that attempt to access the network. For example, in various implementations, the network may include a management zone (e.g., a server system, management application, a management abstraction, etc.) that verifies installation and registration information for each device that accesses or attempts to access the network. Furthermore, the management zone may provide a network administrator with management features for minimizing overhead and redundancy. The administrator may organize network devices into folders 130 and groups 140, and may use registration keys 110 and/or policies 120 to automatically assign a client device to one or more folders 130 and/or groups 140 when the device registers on the network. For example, a registration key 110 may be associated with one or more policies 120 for enforcing registration rules (e.g., system requirement verifications, user authorizations, or other rules). Further, a device registering with the key 110 may automatically be added to one or more folders 130 and/or groups 140 associated with the key 110, as described in greater detail below.

Figure 2:
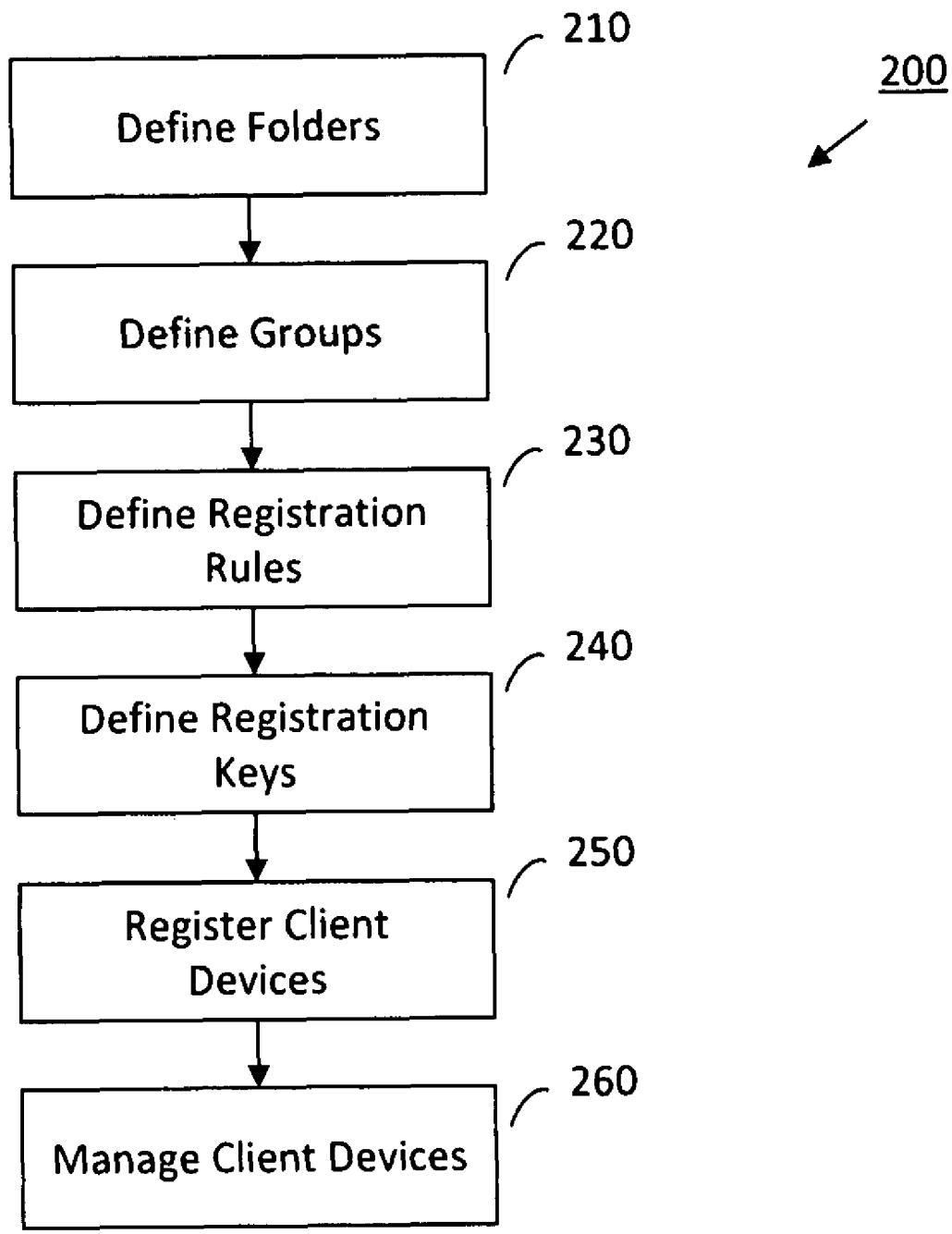
FIG. 2 illustrates an exemplary method for managing device registration according to various aspects of the invention.

Referring to FIG. 2, an exemplary method 200 for managing device registration is illustrated according to various aspects of the invention. Network administrators may use method 200 at any time to create, delete, modify, or otherwise manage devices according to folders, groups, registration rules, policies, keys, or other mechanisms. In networks having large numbers of client devices, however, administrators can minimize management overhead by establishing an organization of folders and groups prior to registering devices into a management zone. As such, client devices can be managed efficiently by adding the devices to folders and groups when the devices initially register on the network. Thus, defining a management structure can significantly reduce configuration efforts by tailoring a network organization according to best practices, device-specific needs, or in other ways, as will be apparent.

Creating an organizational structure for efficiently registering and managing devices can include defining one or more folders in an operation 210, and one or more groups in an operation 220. For example, in various implementations, defining operations 210 and 220 may be implemented prior to registering devices on a network, such that registration rules and keys defined in operations 230 and 240 can be used to automatically add registering devices to appropriate folders and groups (as defined in operations 210 and 220).

In operation 210, folders may be defined to organize devices according to system configuration settings. For example, in various implementations, a management application may be configured to have default folders for workstations and servers, where all devices in the workstation folder have identical system configuration settings, and all devices in the server folder may have identical system configuration settings. As such, in operation 210, a network administrator can define various folders to organize devices according to configuration, system type, or other factors. The folders may be organized in various ways (e.g., a hierarchical organization of folders and sub-folders), allowing an administrator to apply configuration settings to client devices based on a folder containing the devices. For example, the configuration settings may relate to how often the devices in the folder refresh information with a data repository that maintains device representations, what information the devices include in log files, whether a device can be managed remotely, or other configuration settings.

For instance, in an exemplary implementation, a network environment may include a plurality of SUSE Linux servers and a plurality of Red Hat Linux servers. An administrator could apply different system configuration settings to each group of servers by creating a first folder for the SUSE servers and a second folder for the Red Hat servers. The SUSE servers may be managed in the first folder, while the Red Hat servers may be managed in the second folder. As such, an administrator could apply global settings to both the SUSE and the Red Hat serves by defining the global settings at a management zone level, while settings specific to the SUSE servers or the Red Hat servers could be applied by defining the server-specific settings on the first and the second folder, respectively. Moreover, device-specific settings can be applied by directly defining the device-specific settings over a representation of the device (e.g., by defining the settings for a device object, database record, or other representation of the device). Accordingly, by organizing devices into folders and sub-folders, administrators may be provided with an additional level of management for defining configuration settings for similar client devices.

Further, in operation 220, groups may be defined for a collection of devices sharing similar requirements. For example, devices organized within a group may require identical same software packages, operating systems, application configuration settings, inventory collection schedules, or other requirements. For example, a subset of the SUSE and the Red Hat servers described above may belong to a single group (e.g., an Accounting group). As such, despite being organized within different folders based on distinct system configuration settings requirements, the subset of servers may all receive identical accounting software packages. An administrator could thus create an Accounting group, add the subset of servers to the group, and then assign appropriate accounting software packages to the Accounting group. Accordingly, by making an assignment to a group, all devices contained in the group can receive the same assignment in a single operation. Moreover, devices can belong to any number of unique groups, and assignments and associations from multiple groups and/or folders can be additive (e.g., when a device has been assigned to group A and group B, the device may inherit software packages assigned to both groups A and B).

Folders and groups created in operations 210 and 220, respectively, may be used to efficiently manage devices sharing similar characteristics. For example, system configuration settings can be managed through folders created in operation 210, while assignments (e.g., software packages, policies, etc.) can be managed through groups created in operation 220. As such, administrators can place devices having similar configurations by placing the devices in a common folder, and the devices in the folder can be managed by defining the configuration settings on the folder. However, in various implementations, all devices within a folder may not necessarily have identical software package or policy requirements. Therefore, allowing the administrator to further organize the devices into groups, and assigning appropriate software bundles and policies to each group may provide an additional level of management. Organizational strategies may vary from one implementation to another, and may include folders and/or groups to create an easy to manage hierarchical organization (e.g., a folder organization may enable administrators to import devices into a folder for automatically inheriting correct configuration settings, while a group organization may enable administrators to import devices into a group for automatically receiving assignments of software packages, policies, etc.).

Upon defining folders and groups in operations 210 and 220, devices may be added to the defined folders and groups. Administrators may add the devices to the folders and the groups manually (e.g., via a graphical user interface), but manual addition may sometimes be a cumbersome task (e.g., in networks having large numbers of managed devices). As such, in various implementations, registration rules may be created in an operation 230, or registration keys in an operation 240, enabling client devices to be added to folders and/or groups automatically when the devices register on the network. Registration rules and/or keys can be used to assign a name, folder, and group memberships to any given device. For example, registration rules can be used to automatically add client devices to different folders and/or groups based on predefined criteria (e.g., operating system type, central processing unit speed, Internet Protocol address, or other criteria). Registration rules created in operation 230 may be in place of, or in addition to registration keys created in operation 240. For example, when a device registers without a registration key, registration rules may be applied to determine folder and/or group assignments, as well as to name the device. The registration rules may include customized naming schemes, assignments of devices to folders and/or groups based on various policies, filtering criteria for identifying device-specific characteristics, or other rules, as will be apparent.

In operation 240, registration keys may be defined to determine how to register a device (e.g. in operation 250). Registration keys may be formulated according to any suitable unique identification method (e.g., a randomly generated alphanumeric string, a manually created alphanumeric string, an encrypted key, etc.), and may be used during registration of a device. For example, one or more registration keys can be created to place servers and workstations into desired folders and groups (e.g., all devices in a sales department may be added to a Sales folder, and the devices can be divided into different sales groups, such as SalesTeam1, SalesTeam2, SalesTeam3, etc.). As such, an administrator could create various registration keys, which can be configured to add a registering device to one or more folders and/or groups when the device registers in operation 250, as described in greater detail below with reference to FIG. 3.

In operation 260, client devices can be managed based on the folders and/or groups into which the devices have been registered in operation 250. For example, as described above, configuration settings may be managed for devices within a given folder by defining the settings on the folder. Similarly, software assignments or policies can be managed for devices within a given group by defining the assignments or policies on the folder. As such, folders and groups can provide an additional level of management, where administrators can manage configuration settings, software assignments, policies, or other aspects of a network at a folder level, group level, or individual device level. When the management occurs at the folder level or group level, each device in a managed folder or group, or a sub-folder or sub-group thereof, will inherit the management aspects applied to the respective folder or group. For example, a software update can be deployed to an entire group of devices by designating the group to receive the update. Folders and groups can be created by an administrator to distinguish classes of devices based on various characteristics, providing robust management for network devices.

Figure 3:
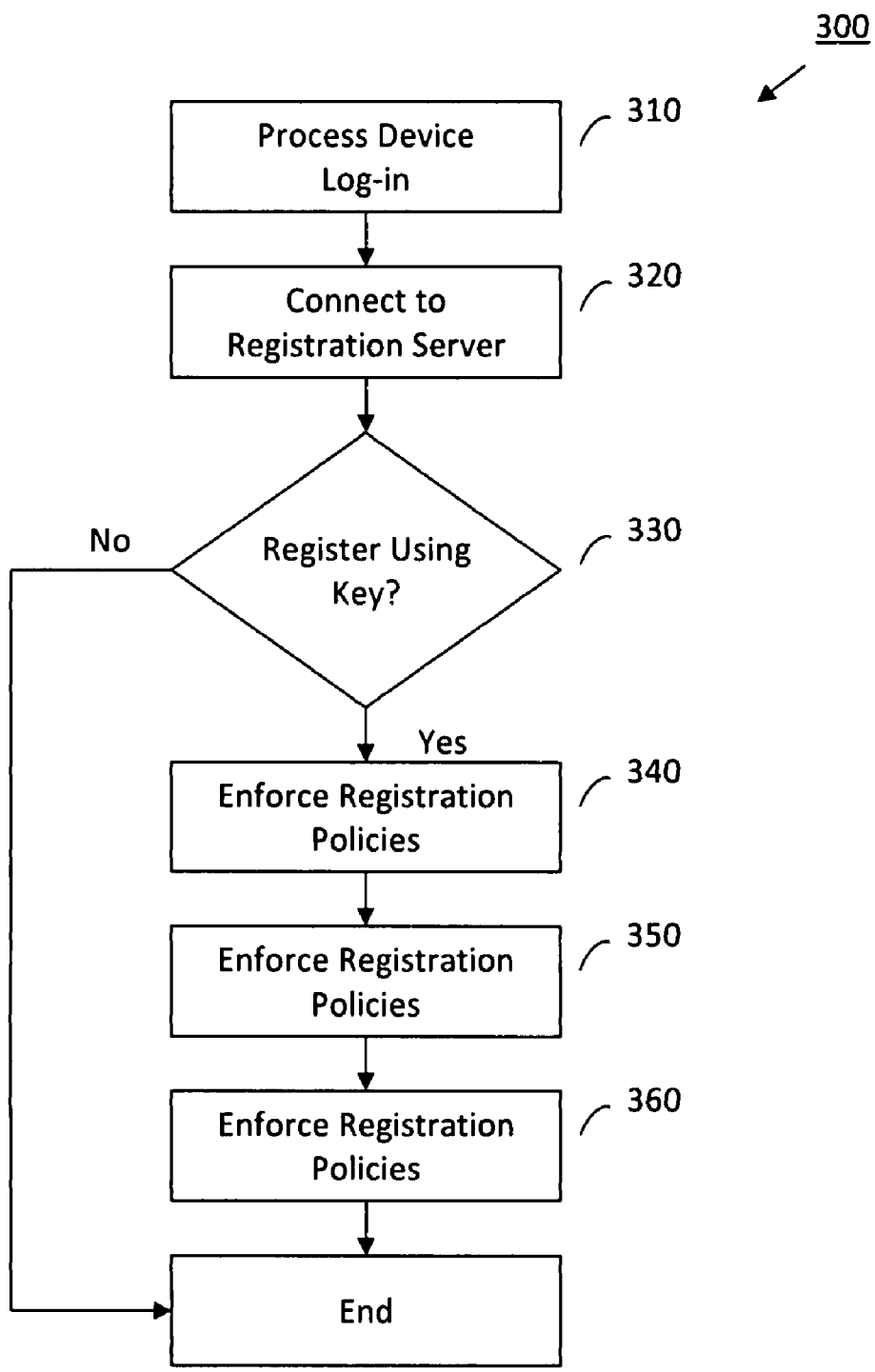
FIG. 3 illustrates an exemplary method for policy-based registration of client devices according to various aspects of the invention.

Referring to FIG. 3, an exemplary method 300 for policy-based registration of client devices is illustrated according to various aspects of the invention. Method 300 may begin in an operation 310, where a device logs in to a management zone to be registered. Log-in information may be processed for the registering device, and the device may connect to a registration server in an operation 320. For example, a user may be prompted to enter an Internet Protocol address or DNS name of a registration server designated for managing the device. Communication between the device and the registration server, or other communications over the network may be based on web service architectures (e.g., SOAP, HTTP(s), etc.). In various implementations, the registration server designated in operation 320 may be a primary server, a secondary server, a server having best network access to the device, or otherwise, as will be apparent.

Subsequently, in an operation 330, a determination may be made as to whether the registration device will use a registration key. The registration key can be communicated from the device to the registration server automatically (e.g., via a response file), or input manually. Upon receiving a registration key, the registration server may enforce one or more registration policies in an operation 340 to control how the device registers on the network (e.g., enforcing security measures, providing authentication mechanisms, etc.). For example, in various implementations, the registration policies may direct a client device to periodically re-register on the network, resulting in a management system having up-to-date device information. For example, a representation of a registered device may include an identifier based on a network name of the device. As such, a user may change the network name of the device, and when the device re-registers with the network, the device representation may be updated to reflect the new name.

In another example, the registration policies may limit a number of devices that can register using any given registration key. For example, the policies may restrict a registration key to three occurrences, and after three devices register using the registration key, subsequent attempts to register using the key may be denied. In various implementations, however, an administrator may dynamically change the limit number to allow additional registrations. As such, device registration may be controlled to provide additional security measures (e.g., a department having one hundred devices may be given a registration key with a limit of one hundred registrations).

Many other variations can be used to enforce registration policies, without limitation, as will be apparent (e.g., a device may be de-registered after a predetermined period of inactivity). Moreover, in operations 350 and 360, the registration server may inspect the registration key to determine which folders and/or groups to add the registering device to. As such, registered devices may be added to easily manageable folders and/or groups on registration, simplifying registration in addition to subsequent management of the registered devices.

Implementations of the invention may be made in hardware, firmware, software, or any combination thereof. The invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable storage medium may include read only memory, random access memory, magnetic disk storage media, optical storage media, flash memory devices, and others, and a machine-readable transmission media may include forms of propagated signals, such as carrier waves, infrared signals, digital signals, and others. Further, firmware, software, routines, or instructions may be described in the above disclosure in terms of specific exemplary aspects and implementations of the invention, and performing certain actions. However, those skilled in the art will recognize that such descriptions are merely for convenience and that such actions in fact result from computing devices, processors, controllers, or other devices executing the firmware, software, routines, or instructions.

Aspects and implementations may be described as including a particular feature, structure, or characteristic, but every aspect or implementation may not necessarily include the particular feature, structure, or characteristic. Further, when a particular feature, structure, or characteristic is described in connection with an aspect or implementation, it is understood that it is within the knowledge of one skilled in the art to effect such feature, structure, or characteristic in connection with other aspects or implementations whether or not explicitly described. Thus, various changes and modifications may be made, without departing from the scope and spirit of the invention. The specification and drawings are to be regarded as exemplary only, and the scope of the invention is to be determined solely by the appended claims.

What is claimed is:

1. A method for registering a client device associated with a computer network, comprising:
    establishing a connection between the client device and the computer network;
    determining whether the connected client device includes a registration key;
    registering the client device in at least one folder in response to determining that the client device includes the registration key, wherein every device registered in the at least one folder, including the client device, inherits one or more configuration settings applied to the at least one folder;
    creating a representation for the registered client device, wherein the representation includes a globally unique identifier linking the client device to the representation created for the client device;
    applying a re-registration policy to the client device, wherein the re-registration policy instructs the client device to provide undated device information based on one or more predetermined criteria; and
    updating the representation for the client device in response to receiving the updated device information from the client device.

2. The method of claim 1, the at least one folder including at least one sub-folder, wherein every device in the at least one sub-folder inherits one or more configuration settings applied to the at least one folder and the at least one sub-folder.

3. The method of claim 1, further comprising:
    receiving one or more registration keys for the client device subsequent to registering the client device in the at least one folder; and
    registering the client device in one or more additional folders using the received registration keys.

4. The method of claim 1, further comprising registering the client device in at least one group in response to determining that the client device includes the registration key, wherein every device registered in the at least one group, including the client device, inherits one or more assignments applied to the at least one group.

5. The method of claim 4, the at least one group including at least one sub-group, wherein every device in the at least one sub-group inherits one or more assignments applied to the at least one group and the at least one sub-group.

6. The method of claim 4, the one or more assignments including deployments of software packages, software bundles, or policies.

7. The method of claim 4, further comprising:
    receiving one or more registration keys for the client device subsequent to registering the client device in the at least one group; and
    registering the client device in one or more additional groups using the received registration keys.

8. The method of claim 1, further comprising applying a default registration policy to register the client device in response to determining that the connected client device does not include the registration key.

9. The method of claim 1, further comprising:
    determining a permitted number of device registrations for the registration key; and
    denying registration of any client devices attempting to register using the registration key in response to determining that the permitted number of device registrations has been reached.

10. A computer readable storage medium storing computer executable instructions for registering a client device associated with a computer network, the instructions operable to:
    establish a connection between the client device and the computer network;
    determine whether the connected client device includes a registration key;
    register the client device in at least one folder in response to determining that the client device includes the registration key, wherein every device in the at least one folder, including the client device, inherits one or more configuration settings applied to the at least one folder;
    create a representation for the registered client device, wherein the representation includes a globally unique identifier linking the client device to the representation created for the client device;
    apply a re-registration policy to the client device, wherein the re-registration policy instructs the client device to provide undated device information based on one or more predetermined criteria; and
    update the representation for the client device in response to receiving the updated device information from the client device.

11. The computer readable storage medium of claim 10, the at least one folder including at least one sub-folder, wherein every device in the at least one sub-folder inherits one or more configuration settings applied to the at least one folder and the at least one sub-folder.

12. The computer readable storage medium of claim 10, the instructions further operable to:

receive one or more registration keys for the client device subsequent to registering the client device in the at least one folder; and register the client device in one or more additional folders using the received registration keys.

13. The computer readable storage medium of claim 10, the instructions further operable to register the client device in at least one group in response to determining that the client device includes the registration key, wherein every device registered in the at least one group, including the client device, inherits one or more assignments applied to the at least one group.

14. The computer readable storage medium of claim 13, the at least one group including at least one sub-group, wherein every device in the at least one sub-group inherits one or more assignments applied to the at least one group and the at least one sub-group.

15. The computer readable storage medium of claim 13, the one or more assignments including deployments of software packages, software bundles, or policies.

16. The computer readable storage medium of claim 13, the instructions further operable to:

receive one or more registration keys for the client device subsequent to registering the client device in the at least one group; and register the client device in one or more additional groups using the received registration keys.

17. The computer readable storage medium of claim 10, the instructions further operable to apply a default registration policy to register the client device in response to determining that the connected client device does not include the registration key.

18. The computer readable storage medium of claim 10, the instructions further operable to:

determine a permitted number of device registrations for the registration key; and deny registration of any client devices attempting to register using the registration key in response to determining that the permitted number of device registrations has been reached.

19. A system for registering a client device associated with a computer network, the system comprising one or more processing devices collectively operable to:

establish a connection between the client device and the computer network;

determine whether the connected client device includes a registration key;

register the client device in at least one folder in response to determining that the client device includes the registration key, wherein every device in the at least one folder, including the client device, inherits one or more configuration settings applied to the at least one folder;

create a representation for the registered client device, wherein the representation includes a globally unique identifier linking the client device to the representation created for the client device;

apply a re-registration policy to the client device, wherein the re-registration policy instructs the client device to provide undated device information based on one or more predetermined criteria; and update the representation for the client device in response to receiving the updated device information from the client device.

20. The system of claim 19, the at least one folder including at least one sub-folder, wherein every device in the at least one sub-folder inherits one or more configuration settings applied to the at least one folder and the at least one sub-folder.

21. The system of claim 19, the processing devices further operable to:

receive one or more registration keys for the client device subsequent to registering the client device in the at least one folder; and register the client device in one or more additional folders using the received registration keys.

22. The system of claim 19, the processing devices further operable to register the client device in at least one group in response to determining that the client device includes the registration key, wherein every device registered in the at least one group, including the client device, inherits one or more assignments applied to the at least one group.

23. The system of claim 22, the at least one group including at least one sub-group, wherein every device in the at least one sub-group inherits one or more assignments applied to the at least one group and the at least one sub-group.

24. The system of claim 22, the one or more assignments including deployments of software packages, software bundles, or policies.

25. The system of claim 22, the processing devices further operable to:

receive one or more registration keys for the client device subsequent to registering the client device in the at least one group; and register the client device in one or more additional groups using the received registration keys.

26. The system of claim 19, the processing devices further operable to apply a default registration policy to register the client device in response to determining that the connected client device does not include the registration key.

27. The system of claim 19, the processing devices further operable to:

determine a permitted number of device registrations for the registration key; and deny registration of any client devices attempting to register using the registration key in response to determining that the permitted number of device registrations has been reached.

* * * * *